United States Patent
Nakajima et al.

(10) Patent No.: US 6,274,243 B1
(45) Date of Patent: Aug. 14, 2001

(54) AUTOMOBILE EXTERIOR COMPONENTS

(75) Inventors: Osamu Nakajima; Tomoyoshi Akiyama; Hiromichi Aoki, all of Takatsuki; Atsushi Takeuchi, Wako, all of (JP)

(73) Assignees: Nippon A & L Incorporated, Osaka; Honda Giken Kogyo KA, Tokyo, both of (JP)

(*) Notice: Subject to any disclaimer, the term of this patent is extended or adjusted under 35 U.S.C. 154(b) by 0 days.

(21) Appl. No.: 09/489,731

(22) Filed: Jan. 21, 2000

(30) Foreign Application Priority Data

Jan. 22, 1999 (JP) .................................................. 11-013802

(51) Int. Cl.⁷ ...................................................... B32B 27/00
(52) U.S. Cl. ..................................... 428/423.5; 428/474.4; 428/500; 428/502
(58) Field of Search ............................. 428/411.1, 423.1, 428/423.5, 424.7, 424.8, 479.4, 475.5, 500, 502

(56) References Cited

U.S. PATENT DOCUMENTS

| 4,824,905 | | 4/1989 | Saeki et al. .............................. 529/66 |
| 5,284,681 | * | 2/1994 | Shinonaga et al. .................. 427/316 |
| 5,571,866 | | 11/1996 | Nishida et al. ........................ 525/98 |
| 5,747,575 | * | 5/1998 | Nishida et al. ....................... 524/443 |
| 5,798,403 | * | 8/1998 | Yamashita et al. .................. 524/447 |
| 5,965,666 | * | 10/1999 | Koo et al. .............................. 525/66 |

FOREIGN PATENT DOCUMENTS

| 0068132 | 1/1983 | (EP) . |
| 0202214 | 11/1986 | (EP) . |
| 0229298 | 7/1987 | (EP) . |
| 0276512 | 8/1988 | (EP) . |
| 0278500 | 8/1988 | (EP) . |
| 0447239 | 9/1991 | (EP) . |
| 0785234 | 7/1997 | (EP) . |
| 0893479 | 1/1999 | (EP) . |
| 3823476 | 11/1938 | (JP) . |
| 63-179957 | 7/1988 | (JP) . |

OTHER PUBLICATIONS

Patent Abstracts of Japan, vol. 1999, No. 14, Dec. 22, 1999.
Patent Abstracts of Japan, vol. 1999, No. 15, Jan. 31, 1900.
Patent Abstracts of Japan, vol. 1997, No. 06, Jun. 30, 1997.
Copy of European Search Report dated May 26, 2000.

* cited by examiner

Primary Examiner—Blaine Copenheavef
Assistant Examiner—Christopher Paulraj
(74) Attorney, Agent, or Firm—Stevens Davis; Miller & Mosher, L.L.P.

(57) ABSTRACT

An automobile exterior component, having good balance between impact resistance and fluidity and being excellent in coating heat resistance and rigidity, which is prepared by performing urethane coating or melamine coating on a molded article obtained by molding a resin composition which comprises a polyamide resin (A); a grafted polymer (B) prepared by graft polymerizing an aromatic vinyl monomer and a vinyl cyanide monomer in the presence of a diene rubber;

an unsaturated carboxylic acid-modified copolymer (C) which has a reduced viscosity of 0.2 to 0.5 dl/g and is prepared by polymerizing an unsaturated carboxylic acid monomer, an aromatic vinyl monomer and a vinyl cyanide monomer;

a copolymer (D) prepared by polymerizing an aromatic vinyl monomer and a vinyl cyanide monomer; and talc, wherein the amount ratio of (A), (B), (C) and (D) is in a specific range.

7 Claims, No Drawings

AUTOMOBILE EXTERIOR COMPONENTS

BACKGROUND OF THE INVENTION

The present invention relates to automobile exterior components. In more detail, it relates to automobile exterior components prepared from a thermoplastic resin composition, having good balance between impact resistance and fluidity and being excellent in coating heat resistance and rigidity.

In recent years, a variety of plastic materials have been used for automobile exterior components such as outside sheathing panels, hub caps, spoilers and bumpers, and requirements for such plastic materials have been rising. For example, high-level impact resistance, fluidity and rigidity are required for plastic materials used for outside sheathing panels. These exterior components are, in many cases, subjected to urethane coating or melamine coating for improving their exterior appearance. Especially, in recent years, a melamine coating, which has been used for coating steel plates for automobile bodies, is also applied for coating outside sheathing resin plates and number of such cases is increasing. Since the baking temperatures in such melamine coating is relatively high, materials to be coated are required to have high heat resistance (coating heat resistance).

Blends composed of a polyamide resin which is excellent in chemical resistance, heat resistance, abrasion resistance and the like and an ABS resin which is excellent in impact resistance, moldability and the like, namely, polyamide/ABS alloys, is proposed (Japanese Patent Publication No. 38-23476. Hereinafter, "Japanese Patent Publication No." is abbreviated to "JP-B-".). Since the polyamide resin and the ABS resin, however, have poor compatibility, a method in which a modified copolymer prepared by copolymerizing an unsaturated carboxylic acid with styrene and acrylonitrile is compounded to these resins has been proposed (Japanese Patent Laid-Open Publication Nos. 63-179957 and 64-158). Hereinafter, "Japanese Patent Laid-Open Publication No." is abbreviated to "JP-A-".). However, these materials do not sufficiently attain the object of the present invention, namely good balance between impact resistance and fluidity and excellent coating heat resistance and rigidity.

SUMMARY OF THE INVENTION

The object of the present invention is to provide automobile exterior components having good balance between impact resistance and fluidity and being excellent in rigidity and coating heat resistance in urethane coating and melamine coating.

EMBODIMENT OF THE INVENTION

The object of the present invention can be attained by an automobile exterior component prepared by performing urethane coating or melamine coating on a molded article obtained by molding a resin composition prepared by compounding an unsaturated carboxylic acid-modified copolymer having a specific reduced viscosity and a specific amount of talc with a polyamide resin and an ABS resin.

That is, the present invention provides an automobile exterior component prepared by performing urethane coating or melamine coating on a molded article obtained by molding a resin composition which comprises 10 to 80 parts by weight of a polyamide resin (A);

10 to 80 parts by weight of a grafted polymer (B) prepared by graft polymerizing a monomer mixture consisting of 50 to 90% by weight of an aromatic vinyl monomer and 10 to 50% by weight of a vinyl cyanide monomer in the presence of a diene rubber, wherein the amounts of the monomer mixture and the diene rubber are 90–20% by weight and 10–80% by weight, respectively, based on the total amount of the monomer mixture and the diene rubber;

1 to 40 parts by weight of an unsaturated carboxylic acid-modified copolymer (C) which has a reduced viscosity of 0.2 to 0.5 dl/g and is prepared by polymerizing an unsaturated carboxylic acid monomer, an aromatic vinyl monomer and a vinyl cyanide monomer, wherein the amounts of the unsaturated carboxylic acid monomer, the aromatic vinyl monomer and the vinyl cyanide monomer are 0.5–20% by weight, 50–89.5% by weight and 10–49.5% by weight, respectively, based on the total amount of the unsaturated carboxylic acid monomer, the aromatic vinyl monomer and the vinyl cyanide monomer;

0 to 50 parts by weight of a copolymer (D) prepared by polymerizing an aromatic vinyl monomer and a vinyl cyanide monomer wherein the amounts of the aromatic vinyl monomer and the vinyl cyanide monomer are 50–90% by weight and 10–50% by weight, respectively, based on the total amount of the aromatic vinyl monomer and the vinyl cyanide monomer; and 0.1 to 10% by weight, based on the total weight of (A), (B), (C) and (D), of talc.

Examples of the polyamide resin (A) used in the present invention include nylon 6, nylon 46, nylon 66, nylon 610, nylon 612, nylon 116, nylon 11, nylon 12, nylon 6I, nylon 6/66, nylon 6T/6I, nylon 6/6T, nylon 66/6T, polytrimethylhexamethyleneterephthalamide, polybis(4-aminocyclohexyl)methane dodecamide, polybis(3-methyl-4-aminocyclohexyl)methane dodecamide, polymetaxylene adipamide, nylon 11T and polyundecamethylenehexahydroterephthalamide. The foregoing "I" and "T" in the name of the polyamide resin (A) indicate that the resin contains an isophthalic acid component and a terephthalic acid component, respectively. Among those polyamide resins, nylon 6, nylon 46, nylon 66, nylon 6T/6I, nylon 6/6T and nylon 66/6T are preferred.

In the present invention, laminar silicate-containing polyamide resins in which laminar silicates are dispersed uniformly in fine conditions can also be used as above polyamide resin (A). The term "fine conditions" used herein means the order of nano meter. The size of laminar silicates dispersed in a polyamide resin is generally in the range of from 1 to 1000 nm, preferably in the range of from 1 to 100 nm. Such a laminar silicate-containing polyamide resin can, for example, be produced by a method in which monomer used for forming polyamide are polymerized in the presence of the laminar silicate or a method in which a laminar silicate and a polyamide resin are melt kneaded. Use of a pre-treated or synthesized laminar silicate permits uniform dispersion of the laminar silicate in fine conditions. Content of the laminar silicate is not limited, although it is preferably in the range of from 0.1 to 30% by weight in the polyamide resin. Examples of such a laminar silicate include natural materials such as montmorillonite, saponite, beidellite, hectorite, nontronite, kaolinite, halloysite, talc and mica, and synthesized materials such as swellable fluorine mica described in JP-A-6-248176. Laminar silicate-containing polyamide resins usable in the present invention are described in JP-A-62-74957 and JP-A-6-248176, for example.

From the viewpoint of heat resistance and rigidity, the laminar silicate-containing polyamide resin as mentioned above and a mixtures of the laminar silicate-containing polyamide resin and other polyamide resins are especially preferred as the polyamide resin (A).

The grafted polymer (B) used in the present invention is a graft polymer prepared by a graft polymerization of a monomer mixture consisting of 50 to 90% by weight of an aromatic vinyl monomer and 10 to 50% by weight of a vinyl cyanide monomer in the presence of a diene rubber. The amounts of the monomer mixture and the diene rubber, used for the graft polymerization, are 90–20% by weight and 10–80% by weight, respectively, based on the total amount of the monomer mixture and the diene rubber.

The diene rubber which constitutes the grafted polymer (B) is a polymer prepared by polymerizing a monomer containing at least 50% by weight of a diene monomer, such as 1,3-butadiene. Preferred monomers which are copolymerizable with the diene monomer include aromatic vinyl monomers such as styrene and α-methylstyrene, vinyl cyanide monomers such as acrylonitrile and methacrylonitrile and alkyl unsaturated carboxylate monomers such as methyl acrylate, ethyl acrylate and methyl methacrylate. Examples of the diene rubber include polybutadiene, butadiene-styrene copolymers, butadiene-acrylonitrile copolymers and butadiene-methyl methacrylate copolymers. Although there is no particular limitation on gel content of the diene rubber, the gel content is preferably from 60 to 95% by weight (measured by using toluene as the solvent.).

Examples of the aromatic vinyl monomer which is grafted on the diene rubber and constitutes the grafted polymer (B) include styrene, α-methylstyrene, paramethylstyrene, chlorostyrene and bromostyrene. One kind of aromatic vinyl monomers may be used singly or two or more kinds of aromatic vinyl monomers may be used in combination. Particularly preferred are styrene and α-methylstyrene.

Examples of the vinyl cyanide monomer include acrylonitrile and methacrylonitrile. One kind of vinyl cyanide monomers may be used singly or two or more kinds of vinyl cyanide monomers may be used in combination. Particularly preferred is acrylonitrile.

A part of the aromatic vinyl monomer may be replaced with other copolymerizable vinyl monomers such as maleimide monomers and unsaturated carboxylate monomers. Examples of the maleimide monomers include maleimide, methylmaleimide, ethylmaleimide, N-phenylmaleimide and O-chloro-N-phenylmaleimide. Examples of the unsaturated carboxylate monomers include methyl acrylate, ethyl acrylate, methyl methacrylate, ethyl methacrylate and 2-ethylhexyl acrylate.

From the viewpoints of balance between impact resistance and fluidity, and heat resistance and rigidity, agglomerated and thickened rubbers prepared by agglomerating small rubber particles having a specific particle size are preferably used as the diene rubber which constitutes the grafted polymer (B). Preferably, a diene rubber latex obtained by agglomerating and thickening a small diene rubber particle latex having a weight average particle size of 0.05 to 0.20μ until it becomes to have a weight average particle size of 0.20 to 0.8μ is used.

A method for agglomerating and thickening the foregoing small diene rubber particle latex is not particularly limited. Conventional known methods, such as methods in which an acidic substance is added (see JP-B-42-3112, JP-B-55-19246, and JP-B-2-9601, and JP-A-63-117005, JP-A-63-132903, JP-A-7-157501, and JP-A-8-259777) and methods in which an acid group-containing latex is added (see JP-A-56-166201, JP-A-59-93701, JP-A-1-126301 and JP-A-8-59704), can be adopted.

A process for producing the above-mentioned grafted polymer is not particularly limited. Polymerization can be performed by an emulsion polymerization method, a suspension polymerization method, a bulk polymerization method, a solution polymerization method and a combination of these methods. When the agglomerated and thickened rubber latex is used, the normal emulsion polymerization method is generally adopted. In the method, known emulsifying agents, initiators and other aids can be employed and there is no limitation about them.

The unsaturated carboxylic acid-modified copolymer (C) used in the present invention has a reduced viscosity of 0.2 to 0.5 dl/g. The copolymer (C) is prepared by co-polymerizing an unsaturated carboxylic acid monomer, an aromatic vinyl monomer and a vinyl cyanide monomer. The amounts of the unsaturated carboxylic acid monomer, the aromatic vinyl monomer and the vinyl cyanide monomer, used for the co-polymerization, are 0.5–20% by weight, 50–89.5% by weight and 10–49.5% by weight, respectively, based on the total amount of the unsaturated carboxylic acid monomer, the aromatic vinyl monomer and the vinyl cyanide monomer.

When the copolymer (C) has a reduced viscosity of less than 0.2 dl/g, its impact resistance becomes poor. When the copolymer has a reduced viscosity of more than 0.5 dl/g, its fluidity becomes poor.

The reduced viscosity of the copolymer (C) is measured at 30° C. using a 0.4 g/dl dimethylformamide (DMF) solution of the copolymer (C).

Examples of the unsaturated carboxylic acid monomer which constitutes the copolymer (C) include acrylic acid, methacrylic acid, maleic acid, fumaric acid and itaconic acid. One kind of the monomers can be used singly, or two or more kinds of them can be used in combination. Particularly preferred is methacrylic acid.

As the aromatic vinyl monomer and the vinyl cyanide monomer, those exemplified as the starting materials for producing the grafted polymer (B) can be exemplified.

A part of the aromatic vinyl monomer may be replaced with other copolymerizable vinyl monomers such as unsaturated carboxylate monomers. Examples of the unsaturated carboxylate monomers include methyl acrylate, ethyl acrylate, methyl methacrylate, ethyl methacrylate and 2-ethylhexyl acrylate.

A conventional polymerization method such as an emulsion polymerization method, a bulk polymerization method, a suspension polymerization method and a solution polymerization method can be adopted for the production of the copolymer (C). In these polymerization methods, known emulsifying agents, initiators and other aids can be employed and there is no limitation about them. In these polymerization methods, the manner for mixing the unsaturated carboxylic acid monomer with other monomers has no limitation. For example, the unsaturated carboxylic acid monomer can be added to the polymerization system after being mixed with one or more kinds of other monomers. The unsaturated carboxylic acid monomer can be added to the polymerization system in a solution form.

The reduced viscosity of the copolymer (C) can be appropriately adjusted by selecting a polymerization temperature, a manner for adding monomers, a kind or an amount of initiators and polymerization chain transfer agents such as t-dodecylmercaptan, to be used.

The copolymer (D) used in the present invention is a copolymer which is prepared by co-polymerizing an aromatic vinyl monomer and a vinyl cyanide monomer. The amounts of the aromatic vinyl monomer and the vinyl cyanide monomer are 50–90% by weight and 10–50% by weight, respectively, based on the total amount of the aromatic vinyl monomer and the vinyl cyanide monomer.

As the aromatic vinyl monomer and the vinyl cyanide monomer which constitutes the copolymer (D), those exemplified as the starting materials for producing the grafted polymer (B) can be exemplified.

In the present invention, a part of the aromatic vinyl monomer which constitutes the copolymer (D) may be replaced with maleimide monomers such as maleimide, methylmaleimide, ethylmaleimide, N-phenylmaleimide, N-cyclohexylmaleimide and O-chloro-N-phenylmaleimide, unsaturated carboxylate monomers such as methyl acrylate, ethyl acrylate, methyl methacrylate, ethyl methacrylate and 2-ethylhexyl acrylate, or the like.

Although the reduced viscosity of the copolymer (D) has no limitation, it is preferably in the range of 0.3 to 1.2 dl/g.

Conventional polymerization methods, such as an emulsion polymerization method, a bulk polymerization method, a suspension polymerization method and a solution polymerization method, can be adopted for the production of the copolymer (D). In these methods, known emulsifying agents, initiators and other aids can be employed and there is no limitation about them.

The resin composition to be molded for producing an automobile exterior component of the present invention is prepared by compounding 0.1 to 10% by weight, based on the total amount of the following (A), (B), (C) and (D), of talc with 10 to 80 parts by weight of the polyamide resin (A), 10 to 80 parts by weight of the grafted polymer (B), 1 to 40 parts by weight of the unsaturated carboxylic acid-modified copolymer and 0 to 50 parts by weight of the copolymer (D). Compounding proportions out of these ranges are not preferred because the molded articles having the favorable properties which the present invention intends to provide can not be obtained.

An order and conditions for mixing the polyamide resin (A), the grafted polymer (B), the unsaturated carboxylic acid-modified copolymer (C), the copolymer (D) and the talc are not limited particularly. For example, all components may be mixed in a lump sum. Alternatively, specific components may be mixed in advance and subsequently the other components may be mixed. The components may be mixed in the form of powder, pellet or the like. In melt kneading of these components, a Banbury mixer, a roll, an extruder or the like can be used.

In the course of mixing, other thermoplastic resins such as polycarbonate, poly(butylene terephthalate), poly(ethylene terephthalate) and poly(phenylene ether), known additives such as antioxidants, ultraviolet absorbers, light stabilizers, antistatic agents, lubricants, dyes, pigments, plasticizers, flame retarders, mold release agents, glass fibers, metal fibers, carbon fibers and metal flakes, fillers other than talc, and the like may be added as needed.

The resin composition thus obtained is then subjected to a molding and, subsequently, the molded article is subjected to urethane coating or melamine coating to prepare an automobile exterior component of the present invention.

Examples of the automobile exterior components according to the present invention include a door panel, a front fender, a rear fender, a table gate panel, a hub cap, a spoiler, a bumper and a pillar.

Such an exterior component can be molded by a conventional molding method such as injection molding, extrusion molding and blow molding.

The molded article is then subjected to urethane coating or melamine coating. Paints which are generally used for coating steel plates for automobile bodies or automobile exterior resin components can be used in the urethane coating or melamine coating.

For example, in the melamine coating, paints containing an acrylmelamine resin-based paint or a polyestermelamine resin-based paint as a main component can be used. In the urethane coating, paints containing an acrylurethane resin-based paint as a main component can be used.

In the coating, a non-crosslinked type primer containing a chlorinated polyolefin resin or a polyesterurethane resin as a main component can also be used as a primer. A conductive primer having conductivity for electrostatic coating can also be used as a primer.

The present invention will be described in more detail with the following examples, which should not be construed to restrict the present invention. Parts and % are by weight basis unless otherwise mentioned.

REFERENTIAL EXAMPLE 1

Into a pressure vessel, 100 parts of 1,3-butadiene, 0.3 part of t-dodecylmercaptan, 0.25 part of potassium persulfate, 2.5 parts of sodium rhodinate, 0.1 part of sodium hydroxide and 170 parts of pure water were charged. After heating the mixture to 80° C., polymerization was commenced. The polymerization was completed in ten hours. The resulting diene rubber latex (b–①) had a solid content of 37%, a weight average particle size of $0.1\mu$ and a gel content of 90%.

The gel content was measured according to the following manner:

The latex was dried to form a film. About 1-gram of the film sample was weighed out and, then, immersed in toluene at 23° C. for 48 hours. The insoluble matter was filtered off with a 100-meshed wire net, dried and weighed. The gel content is % by weight of the insoluble matter based on the weight of the film sample.

REFERENTIAL EXAMPLE 2

Into a pressure vessel, 270 parts of the diene rubber latex (b–①) obtained in Referential Example 1 and 0.1 part of sodium dodecylbenzenesulfonate were charged and stirred for 10 minutes. Subsequently, to the resulting mixture was added 20 parts of a 5% aqueous phosphoric acid solution over 10 minutes. Thereafter, 10 parts of a 10% aqueous potassium hydroxide solution was added to obtain a thickened diene rubber latex (b–1) having a solid content of 34% and a weight average particle size of $0.3\mu$.

REFERENTIAL EXAMPLE 3

Into a pressure vessel, 50 parts (solid content) of the thickened diene rubber latex (b–1) obtained in Referential Example 2, 1.5 parts of sodium dodecylbenzenesulfonate and 0.3 part of potassium persulfate were charged. After heating the mixture to 70° C., a monomer mixture composed of 35 parts of styrene and 15 parts of acrylonitrile was added continuously over 5 hours to yield a grafted polymer latex B–1. After adding 1 part of a phenol type antioxidant (Sumilizer BBM manufactured by Sumitomo Chemical Co., Ltd.) as an antioxidant and 2 parts of trisnonylphenylphosphite to 100 parts (solid content) of the resulting latex, salting out with magnesium sulfate, dehydration and drying were performed to obtain the grafted polymer B–1.

According to the same manner as the polymerization mentioned above except for changing the amounts of the diene rubber latex, styrene and acrylonitrile to 60 parts (solid content), 28 parts and 12 parts, respectively, a grafted polymer B–2 was obtained

REFERENTIAL EXAMPLE 4

Into a pressure vessel, 120 parts of pure water and 0.3 part of potassium persulfate were charged. After heating the mixture to 65° C. under stirring, a mixed monomer solution composed of 67 parts of styrene, 30 parts of acrylonitrile, 3 parts of methacrylic acid and 1.5 parts of t-dodecylmercaptan, and 30 parts of an aqueous emulsifying agent solution containing 2 parts of sodium dodecylbenzenesulfonate were added continuously over 5 hours, respectively. The polymerization system was subsequently heated to 70° C. and aged for 3 hours to complete polymerization. Thereafter, salting out with calcium chloride, dehydration and drying was performed to obtain an unsaturated carboxylic acid-modified copolymer C-1. The resulting copolymer C-1 had a reduced viscosity of 0.3.

According to the same manner as the polymerization for producing C-1 except for changing the amounts of styrene, acrylonitrile and methacrylic acid to 60 parts, 30 parts and 10 parts, respectively, an unsaturated carboxylic acid-modified copolymer C-2 was obtained. The resulting copolymer C-2 had a reduced viscosity of 0.32.

Furthermore, according to the same manner as the polymerization for producing C-1 except for changing the amount of t-dodecylmercaptan to 0.3 part, an unsaturated carboxylic acid-modified copolymer C-i was obtained. The resulting copolymer C-i had a reduced viscosity of 0.65.

REFERENTIAL EXAMPLE 5

Into a pressure vessel, 120 parts of pure water and 0.3 part of potassium persulfate were charged. After heating the mixture to 65° C. under stirring, a mixed monomer solution composed of 70 parts of styrene, 30 parts of acrylonitrile and 0.3 part of t-dodecylmercaptan, and 30 parts of an aqueous emulsifying agent solution containing 2 parts of sodium dodecylbenzenesulfonate were added continuously over 5 hours, respectively. The polymerization system is subsequently heated to 70° C. and aged for 3 hours to complete the polymerization. After that, salting out with calcium chloride, dehydration and drying were performed to obtain a copolymer D-1. The resulting copolymer D-1 had a reduced viscosity of 0.6.

EXAMPLES 1 TO 4 AND COMPARATIVE EXAMPLES 1 TO 6

Polyamide resins (A), the grafted copolymers (B), copolymers (C) and copolymer (D) prepared in the Referential Examples and talc were compounded in proportions shown in Table 1, and melt kneaded with a 40 mm twin screw extruder at 250° C. to form into pellets. Thereafter, the pellets thus obtained were molded into various kinds of specimens with an injection molding machine, and physical properties of the specimens were evaluated. Results are shown in Table 1.

In Table 1, "A-1" indicates nylon 6 (Unitika Nylon 6 A1030BRL manufactured by Unitika Ltd.), and "A-2" indicates a material prepared by dispersing 4.0% of a laminar silicate in nylon 6 (Unitika Nylon 6 A1030BRL manufactured by Unitika Ltd.) uniformly in fine conditions. "A-1" and "A-2" were used as a polyamide resins (A) in Examples and Comparative Examples. In Examples and Comparative Examples, Micronwhite #5000S manufactured by Hayashi Chemical Co., Ltd. was used as the talc.

The physical properties shown in Table 1 were measured according to the following conditions.

Impact resistance: Determined according to ASTM D-256. ⅛ inch, 23° C.

Fluidity (Spiral flow length): A spiral flow length (mm) was measured under conditions of set temperature: 260° C., pressure: 1000 kg/cm$^2$ and injection speed: 50% by using an Archimedes type spiral flow mold (3 mmt) and an injection molding machine (Model N-140BII manufactured by The Japan Steel Works, Ltd.)

Heat resistance: Determined according to ASTM D-648. ¼ inch, 4.6 kg/cm$^2$ load

Rigidity: Determined according to ASTM D-790.

Melamine coating suitability: A box-shaped molded article having 220-mm width, 280-mm length, 110-mm depth and 2.7-mm thickness was formed with an injection molding machine. The molded article was coated with a melamine paint to form a 30 μm thick coating, followed by being subjected to baking in an explosion-proof oven in which the internal temperature was controlled at 120° C. with the box-shaped molded article bottom up. After a lapse of 30 minutes, the coated molded article was taken out of the oven. After cooling for 2 hours at room temperature, degree of deformation at the center area of the bottom of the molded article was observed.

○: No deformation was observed.

×: Significant deformation (dimensional change) after coating was observed.

TABLE 1

|  | Example 1 | Example 2 | Comparative Example 1 | Comparative Example 2 | Example 3 | Comparative Example 3 | Example 4 | Comparative Example 4 |
|---|---|---|---|---|---|---|---|---|
| Composition; |  |  |  |  |  |  |  |  |
| Polyamide (A-1) |  | 30 | 30 | 30 | 40 | 40 | 30 | 30 |
| Polyamide (A-2) | 30 |  |  |  | 10 | 10 | 10 | 10 |
| Grafted polymer (B-1) | 40 | 40 | 40 | 40 |  |  | 40 | 40 |
| Grafted polymer (B-2) |  |  |  |  | 30 | 30 |  |  |
| Copolymer (C-1) | 10 | 10 | 10 |  |  |  | 10 |  |
| Copolymer (C-2) |  |  |  | 10 |  |  |  |  |
| Copolymer (C-i) |  |  |  |  | 10 | 10 |  | 10 |
| Copolymer (D-1) | 20 | 20 | 20 | 20 | 10 | 10 | 10 | 10 |
| Talc | 5 | 5 |  | 5 | 10 | 10 | 5 | 5 |
| Rubber content in composition (%) | 20 | 20 | 20 | 20 | 18 | 18 | 20 | 20 |
| Physical properties |  |  |  |  |  |  |  |  |
| Impact resistance (kg · cm/cm) | 51 | 40 | 78 | 51 | 20 | 23 | 30 | 33 |

TABLE 1-continued

|  | Example | | Comparative Example | | Example | Comparative Example | Example | Comparative Example |
| --- | --- | --- | --- | --- | --- | --- | --- | --- |
|  | 1 | 2 | 1 | 2 | 3 | 3 | 4 | 4 |
| Spiral flow length (mm) | 650 | 640 | 645 | 410 | 680 | 430 | 720 | 445 |
| Heat resistance (° C.) | 141 | 123 | 101 | 124 | 155 | 156 | 148 | 146 |
| Rigidity (kg/m$^2$) | 24500 | 22000 | 17000 | 22000 | 26000 | 26000 | 25000 | 25000 |
| Melamine coating suitability | ○ | ○ | X | ○ | ○ | ○ | ○ | ○ |

As mentioned above, the automobile exterior component according to the present invention has good balance between impact resistance and fluidity and is excellent in coating heat resistance and rigidity. Therefore, it is useful, particularly, as an outside sheathing panel, a hub cap, a spoiler, a bumper and the like.

What is claimed is:

1. An automobile exterior component prepared by performing urethane coating or melamine coating on a molded article obtained by molding a resin composition which comprises 10 to 80 parts by weight of a polyamide resin (A);

10 to 80 parts by weight of a grafted polymer (B) prepared by graft polymerizing a monomer mixture consisting of 50 to 90% by weight of an aromatic vinyl monomer and 10 to 50% by weight of a vinyl cyanide monomer in the presence of a diene rubber, wherein the amounts of the monomer mixture and the diene rubber are 90–20% by weight and 10–80% by weight, respectively, based on the total amount of the monomer mixture and the diene rubber;

1 to 40 parts by weight of an unsaturated carboxylic acid-modified copolymer (C) which has a reduced viscosity of 0.2 to 0.5 dl/g and is prepared by polymerizing an unsaturated carboxylic acid monomer, an aromatic vinyl monomer and a vinyl cyanide monomer, wherein the amounts of the unsaturated carboxylic acid monomer, the aromatic vinyl monomer and the vinyl cyanide monomer are 0.5–20% by weight, 50–89.5% by weight and 10–49.5% by weight, respectively, based on the total amount of the unsaturated carboxylic acid monomer, the aromatic vinyl monomer and the vinyl cyanide monomer;

0 to 50 parts by weight of a copolymer (D) prepared by polymerizing an aromatic vinyl monomer and a vinyl cyanide monomer wherein the amounts of the aromatic vinyl monomer and the vinyl cyanide monomer are 50–90% by weight and 10–50% by weight, respectively, based on the total amount of the aromatic vinyl monomer and the vinyl cyanide monomer; and 0.1 to 10% by weight, based on the total weight of (A), (B), (C) and (D), of talc.

2. The automobile exterior component according to claim 1 wherein the polyamide resin (A) is selected from the group consisting of nylon 6, nylon 46, nylon 66, nylon 6T/6I, nylon 6/6T and nylon 66/6T.

3. The automobile exterior component according to claim 1 wherein the polyamide resin (A) is a laminar silicate-containing polyamide resin or a mixtures thereof.

4. The automobile exterior component according to claim 1 wherein the diene rubber is from selected the group consisting of polybutadiene, butadiene-styrene copolymers, butadiene-acrylonitrile copolymers and butadiene-methyl methacrylate copolymers.

5. The automobile exterior component according to claim 1 wherein the unsaturated carboxylic acid monomer is selected from the group consisting of acrylic acid, methacrylic acid, maleic acid, fumaric acid and itaconic acid.

6. The automobile exterior component according to claim 1 wherein the aromatic vinyl monomer composing to the grafted polymer (B), the unsaturated carboxylic acid-modified copolymer (C) or the copolymer (D) is selected from the group consisting of styrene, α-methylstyrene, paramethylstyrene, chlorostyrene and bromostyrene.

7. The automobile exterior component according to claim 1 wherein the vinyl cyanide monomer composing to the grafted polymer (B), the unsaturated carboxylic acid-modified copolymer (C) or the copolymer (D) is selected from the group consisting of acrylonitrile and methacrylonitrile.

* * * * *